July 2, 1963
J. PERDUE ETAL
3,096,051
AIRCRAFT UNDERCARRIAGE
Filed March 17, 1958
3 Sheets-Sheet 1
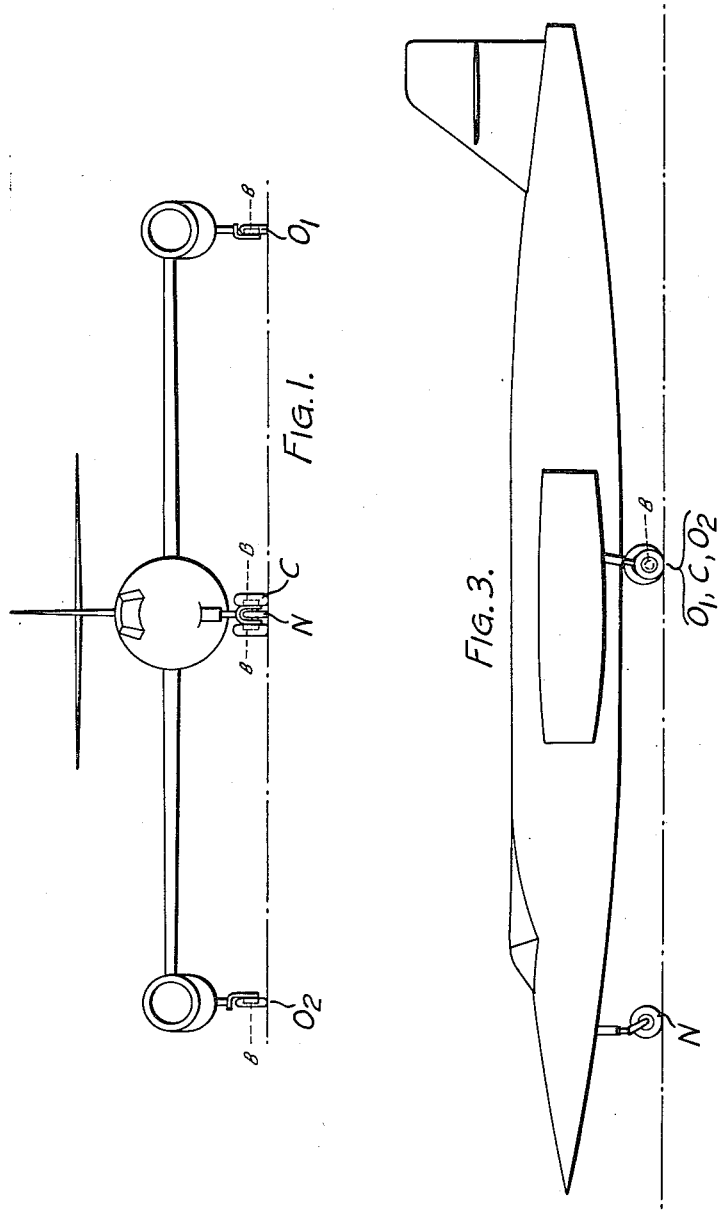

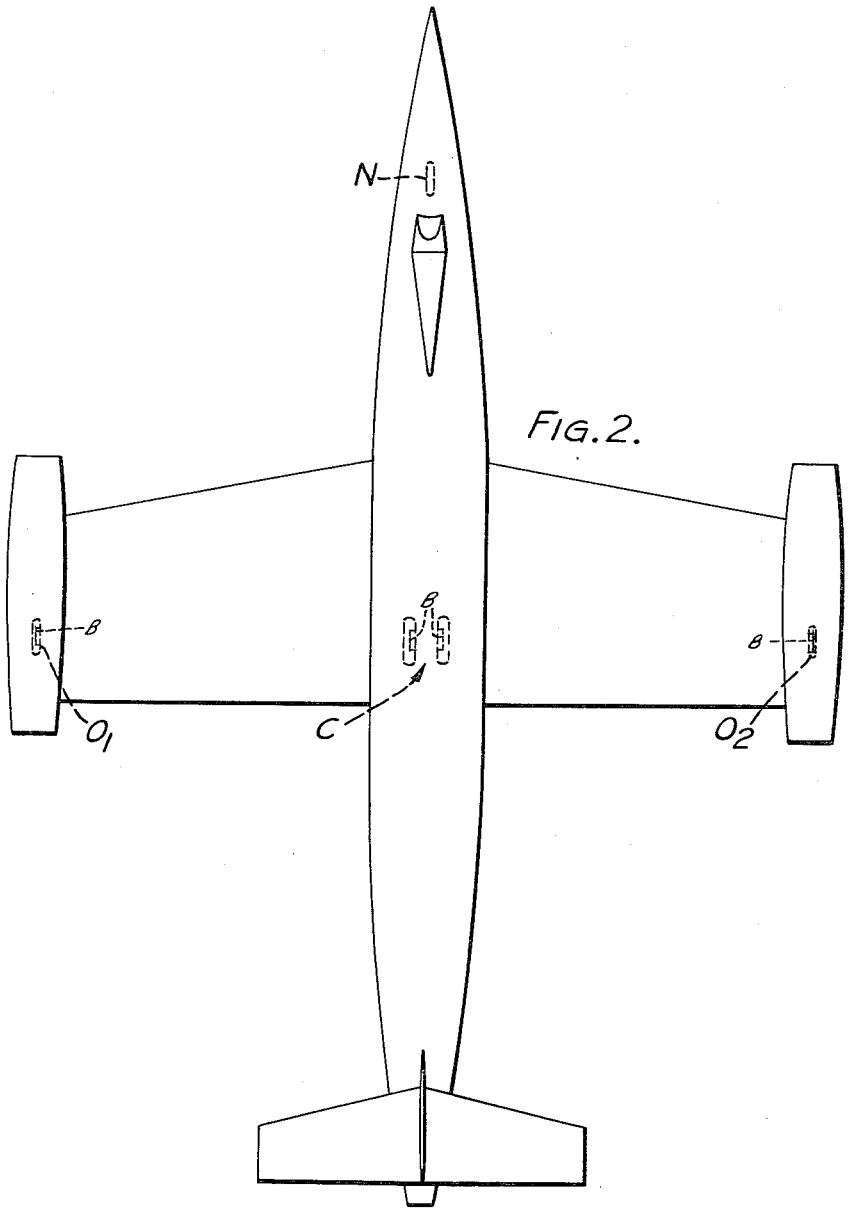

July 2, 1963  J. PERDUE ETAL  3,096,051
AIRCRAFT UNDERCARRIAGE
Filed March 17, 1958  3 Sheets-Sheet 3

Inventors:
Jack Perdue
and
Christopher Bernard Vere Neilson
By their attorneys:
Baldwin & Wight

United States Patent Office 3,096,051
Patented July 2, 1963

3,096,051
AIRCRAFT UNDERCARRIAGE
Jack Perdue, Warrington, and Christopher Bernard Vere-Neilson, Norton, near Runcorn, England, assignors to Electro-Hydraulics Limited, Warrington, England, a corporation of the United Kingdom
Filed Mar. 17, 1958, Ser. No. 721,848
1 Claim. (Cl. 244—100)

This invention relates to aircraft and concerns the distribution of the load carrying capacity over retractable landing gear. The invention is more particularly concerned with such matters when applied to high speed aircraft.

One common form of aircraft landing gear is the tricycle arrangement in which the nose unit carries about 10% of the aircraft weight, the remaining 90% being shared equally between the two main units. This configuration is thoroughly satisfactory, from the performance point of view, as it facilitates an approach to the runway in a tail down attitude when both lift and drag are relatively high, and it ensures that, even on a banked landing, the first contact with the ground is made by a substantial undercarriage. Although nose wheel steering is limited in its effect, it is adequately supplemented by the differential braking on the well spaced main undercarriages. Moreover, when associated with the lower speed multi-engined type of aircraft or even single engine types with reasonable thickness/chord ratio wings, it rarely presents any serious problem from the retraction point of view, as space for the nose unit can be found in the fuselage and the main units can be housed in the engine nacelles or in the wings.

For the small high speed aircraft the tricycle configuration may still be adopted, for when retraction space in the wing becomes impracticable due to low thickness/chord ratios, the main units can be retracted into the sides of the fuselage. For most types of large high speed machines, use of the tricycle configuration is no longer a practical proposition, as fuselage stowage of the main units imposes severe limitation on the track of the main wheels and the thin wings required for aerodynamic reasons provide no stowage space for large undercarriages and difficulty may even be encountered in finding sufficient retraction space in which to house two main units in the sides of the fuselage.

An alternative configuration which has been adopted for use with large high speed aircraft is the bicycle type; here the nose unit supports about 45% of the aircraft weight and the main unit the remaining 55%. Both units are located on the centre line of the aircraft and retracted into the fuselage while an outrigger unit, usually provided with this configuration, is attached to each wing at some reasonable distance from the fuselage and is used to restrain the aircraft on an even keel during taxying and manoeuvering, but contributes nothing to the landing function.

One reason for the weight distribution of 45% to 55% in this configuration is to obtain a reasonable steering performance when the aircraft is taxying, as, unlike the usual tricycle configuration described earlier, there is no possibility of supplementing the turning moment applied to the aircraft by the nose undercarriage by means of differential braking, as the main wheels are not laterally offset with respect to the centre of gravity, to any appreciable extent.

With this bicycle configuration, on account of the high percentage of weight carried by the nose wheel, it is necessary that the landing approach should be carried out at a very restricted attitude in order to avoid severe pitching at the nose wheel touches the ground. At the same time there are further restrictions to ensure that the outriggers do not touch down in such a way as to take load before the main undercarriage, as they are not designed as substantial load carrying units.

In view of the fact that these outriggers are not designed to carry a substantial load, no use can be made of them for differential braking to supplement the steering control available from the nose undercarriage, and consequently brakes are not provided in such cases.

A further disadvantage of the bicycle type of undercarriage when applied to very large aircraft is that a highly concentrated load is applied to the airfield runway by the central undercarriage.

The object of this invention is to provide an undercarriage configuration which is suitable for certain types of high speed aircraft and overcomes the difficulties outlined above.

According to the present invention an aircraft is provided with at least four sets of undercarriage equipment, one of which comprises a nose undercarriage, whilst the three other sets form a main group of undercarriages of which one is disposed beneath the fuselage the other two being disposed adjacent the wing tips in transverse alignment with each other with respect to the longitudinal axis of the aircraft.

The one undercarriage of the main group may be disposed on the longitudinal axis of the fuselage and the other two may be disposed adjacent to the wing tips. The three undercarriages of the main group may all be in transverse alignment.

In such a configuration of undercarriage equipment it is still possible to provide for the conventional distribution of load as between the nose undercarriage and the main group of undercarriages, for example 10% on the nose undercarriage and 90% on the main group of undercarriages and for this reason the aircraft can come in to land in a normal tail-down attitude allowing the nose to come to the ground appreciably after touch-down of the main group of undercarriages.

Embodiments of the present invention are illustrated in the accompanying schematic drawings, in which:

FIGURE 1 is a front elevation of one embodiment of the invention;

FIGURE 2 is a plan thereof;

FIGURE 3 is a side elevation thereof;

Figure 4:
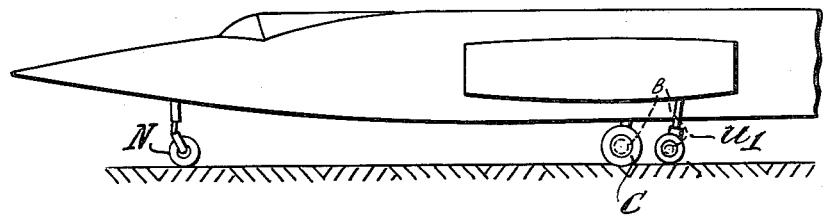
FIGURE 4 is a side elevation of part of an aircraft embodying the invention in slightly modified form.

Referring to the drawings, in particular FIGURES 1, 2 and 3, an aircraft is provided with wings of low thickness/chord ratio which carry at their tips nacelles housing the power units. As will be seen from the drawing there is provided a nose undercarriage N which is mounted and retractable into the forward section of the fuselage; a main centre undercarriage C is mounted and retractable into the fuselage centre section. Two outer undercarriages $O_1$, $O_2$ are mounted and retractable into the power unit nacelles located at the wing tips and are in transverse alignment with the centre undercarriage C. The undercarriage C is arranged to carry approximately 40% to 70% of the aircraft weight, whilst the nose undercarriage N carries the conventional 10%. The remaining load of 20% to 50% is divided between the two undercarriages $O_1$, $O_2$ which can either, as stated above, retract into the power unit nacelles which are widely spaced with respect to one another or can be folded flat into the wings. Because of the division of the remaining load of 20% to 50% between the two undercarriages $O_1$, $O_2$, each of these carries a load of between 10% and 25% of the static weight of the aircraft. It follows from this distribution of load with the nose undercarriage N carrying the conventional 10%, considered in connection with the transverse alignment of the main undercarriage equipments $O_1$, C and $O_2$, that all of the main undercarriage equipments $O_1$, C and $O_2$ are in rear of the centre of gravity of the aircraft.

Figure 5:
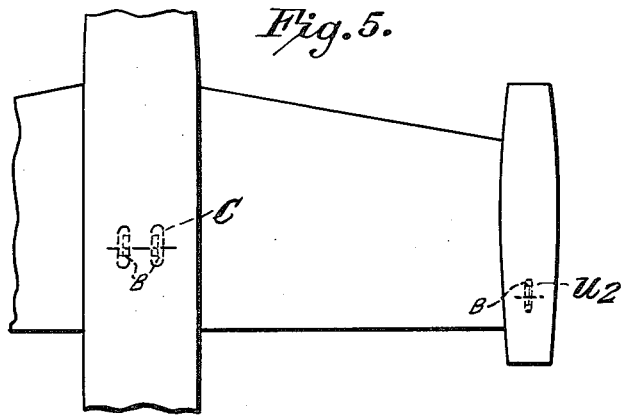
FIGURE 5 is a plan of part thereof.

Referring now to FIGURES 4 and 5, two outer undercarriages $U_1$ and $U_2$ are mounted and retractable into the power unit nacelles located at the wing tips and are in transverse alignment with each other with respect to the longitudinal axis of the aircraft and are slightly rearward of the centre undercarriage C. The static loading of the undercarriages arranged in this manner is the same as described hereinbefore.

These outer undercarriages $O_1$, $O_2$ and $U_1$, $U_2$, although contributing only a small proportion of the landing energy, have two important functions. One is that, being equipped with brakes indicated schematically at B, they provide differential braking which stabilizes the control of the aircraft on the runway, and the other is that they are designed to cater for a banked landing in such a way that any rolling tendency on the aeroplane can be fully damped out during an initial touch-down, without producing any impact loading on any of its load-carrying members.

With such arrangements of undercarriage equipment, the aircraft can come in to land in a normal tail-down approach attitude which provides the advantage, which is lost by the bicycle type of undercarriage, referred to above, in that the effect that the tail-down attitude has in slowing down the aircraft during the early part of the landing run reduces the total length of runway required.

The outer undercarriages $U_1$ and $U_2$ may be arranged slightly aft or forward of the centre undercarriage C and their disposition can be such that pitching and rolling effects of the aircraft on landing can be reduced to a minimum whilst the static wheel loads are properly balanced.

What is claimed is:

An aircraft including a fuselage and wing structure, a nose undercarriage, and a main group comprising three sets of main undercarriage equipment of which one is disposed beneath the fuselage and the other two are disposed one adjacent to each wing tip in transverse alignment with each other with respect to the longitudinal axis of the aircraft, each of said main undercarriage equipments having a brake, said three sets of main undercarriage equipment all being in the rear of the center of gravity of the aircraft and being so disposed relatively to said structure and to each other that, on land, said three sets of undercarriage equipment together carry substantially 90% of the static weight of the aircraft and each of said other two sets of undercarriage equipment carries between 10% and 25% of the static weight of the aircraft, a substantial proportion of the horizontal kinetic energy of the aircraft on landing being absorbed by the brakes of each of said three main undercarriage equipments.

References Cited in the file of this patent

UNITED STATES PATENTS

| | | |
|---|---|---|
| 1,872,811 | Reel | Aug. 23, 1932 |
| 2,316,885 | Ortega | Apr. 20, 1943 |
| 2,577,385 | Troendle | Dec. 4, 1951 |
| 2,752,112 | Payne | June 26, 1956 |
| 2,989,268 | Andrews | June 20, 1961 |

FOREIGN PATENTS

| | | |
|---|---|---|
| 970,181 | France | June 7, 1950 |